(12) United States Patent
Hsu

(10) Patent No.: US 9,046,168 B2
(45) Date of Patent: Jun. 2, 2015

(54) DEVICE FOR ACTUATING A VALVE

(76) Inventor: Kuo-Feng Hsu, Taipei (TW)

( * ) Notice: Subject to any disclaimer, the term of this patent is extended or adjusted under 35 U.S.C. 154(b) by 340 days.

(21) Appl. No.: 13/596,059

(22) Filed: Aug. 28, 2012

(65) Prior Publication Data

US 2013/0324353 A1    Dec. 5, 2013

(30) Foreign Application Priority Data

Jun. 1, 2012 (TW) .............................. 101210569 U

(51) Int. Cl.
*F16H 57/08* (2006.01)
*F16K 31/53* (2006.01)
*F16K 31/05* (2006.01)

(52) U.S. Cl.
CPC ............ *F16H 57/082* (2013.01); *F16K 31/535* (2013.01); *F16K 31/055* (2013.01)

(58) Field of Classification Search
CPC ...................................................... F16H 57/082
USPC ................................................. 475/218, 343
See application file for complete search history.

(56) References Cited

U.S. PATENT DOCUMENTS 4,754,949 A * 7/1988 Fukamachi ....................... 475/4

* cited by examiner

*Primary Examiner* — Derek D Knight
(74) *Attorney, Agent, or Firm* — Leong C. Lei

(57) ABSTRACT

An improved device, for actuating a valve, comprises a housing and a gear train accommodated in the housing. The gear train includes a center gearset, a planet-pinion carrier, and an output internal gear. The center gearset includes a first external gear and a second external gear being coaxially fixed to the first external gear. The planet-pinion carrier is mounted around the first external gear of the center gearset, wherein a first bearing is provided between the center gearset and the planet-pinion carrier; at least three pinions are mounted at a bottom or inside of the planet-pinion carrier, the pinions being meshed with the first external gear of the center gearset. The output internal gear is mounted in mesh with the pinions, wherein a second bearing is provided between the output internal gear and the housing. The present invention is durable in structure and has a high transmission efficiency.

6 Claims, 7 Drawing Sheets

DEVICE FOR ACTUATING A VALVE

TECHNICAL FIELD OF THE INVENTION

The present invention relates to a device for actuating a valve, and more particularly to an improved device that is durable in structure and has a high transmission efficiency.

DESCRIPTION OF THE PRIOR ART

A control valve is generally composed of three basic subassemblies including a body, a movable plug, and an actuator, wherein the actuator is connected to the plug and can move the plug when the actuator receives motive power. The control valve is widely applied in the drainage system, HVAC system, petroleum plants, chemical plants, electronic plants, food factories, pharmaceutical factories, textile factories, ships, energy system, etc. With a control valve, a flow can be manipulated to meet the requirement of a process. Since conventional actuators usually employ a planetary gearset consisting of two pinions, the associated valves cannot be operated smoothly. Besides, the gears are prone to be worn out, thereby causing a failure in operation. Thus, there is a need for improvement of the existing actuators.

In view of the above disadvantages, based on the long-term experiences and constant tests and modifications, the applicant has contrived an improved device for actuating a valve, which is durable in structure and has a high transmission efficiency.

SUMMARY OF THE INVENTION

The primary object of the present invention is to provide an improved device for actuating a valve, which can remove the disadvantages of the existing actuators to have a durable structure and a high transmission efficiency.

To achieve the above the purpose, the actuating device may comprise a housing and a gear train accommodated in the housing. The gear train includes a center gearset, a planet-pinion carrier, and an output internal gear. The center gearset includes a first external gear and a second external gear being coaxially fixed to the first external gear by a central axle. The center gearset is in mesh with an electrical device. The planet-pinion carrier is mounted around the first external gear of the center gearset, wherein a first bearing is provided between the center gearset and the planet-pinion carrier; at least three pinions are mounted at a bottom or inside of the planet-pinion carrier, the pinions being meshed with the first external gear of the center gearset. The output internal gear is mounted in mesh with the pinions, wherein a second bearing is mounted between the output internal gear and the housing; a central axle is inserted through the center of the center gearset and inserted into the center of the output internal gear. Also, a worm gear is mounted on top of the output internal gear around the pinions, wherein the worm gear has internal teeth in mesh with the pinions and external teeth in mesh with a manual-operated worm. The third bearing is mounted between the worm gear and the planet-pinion carrier.

The output internal gear is provided with an output coupling means at a bottom thereof. As such, the center gearset can drive the output internal gear into rotation, thereby moving a shaft of a valve through adaptation of the output coupling means to achieve the purpose of manipulating a flow through the valve.

Other objects, advantages, and novel features of the present invention will become more apparent from the following detailed description when taken in conjunction with the accompanying drawings.

DETAILED DESCRIPTION OF THE PREFERRED EMBODIMENTS

To achieve the above object and effects, a preferred embodiment of the present invention will be detailed with reference to the accompanying drawings, to allow the technical means and structures of the present invention to be fully understood.

Figure 1:
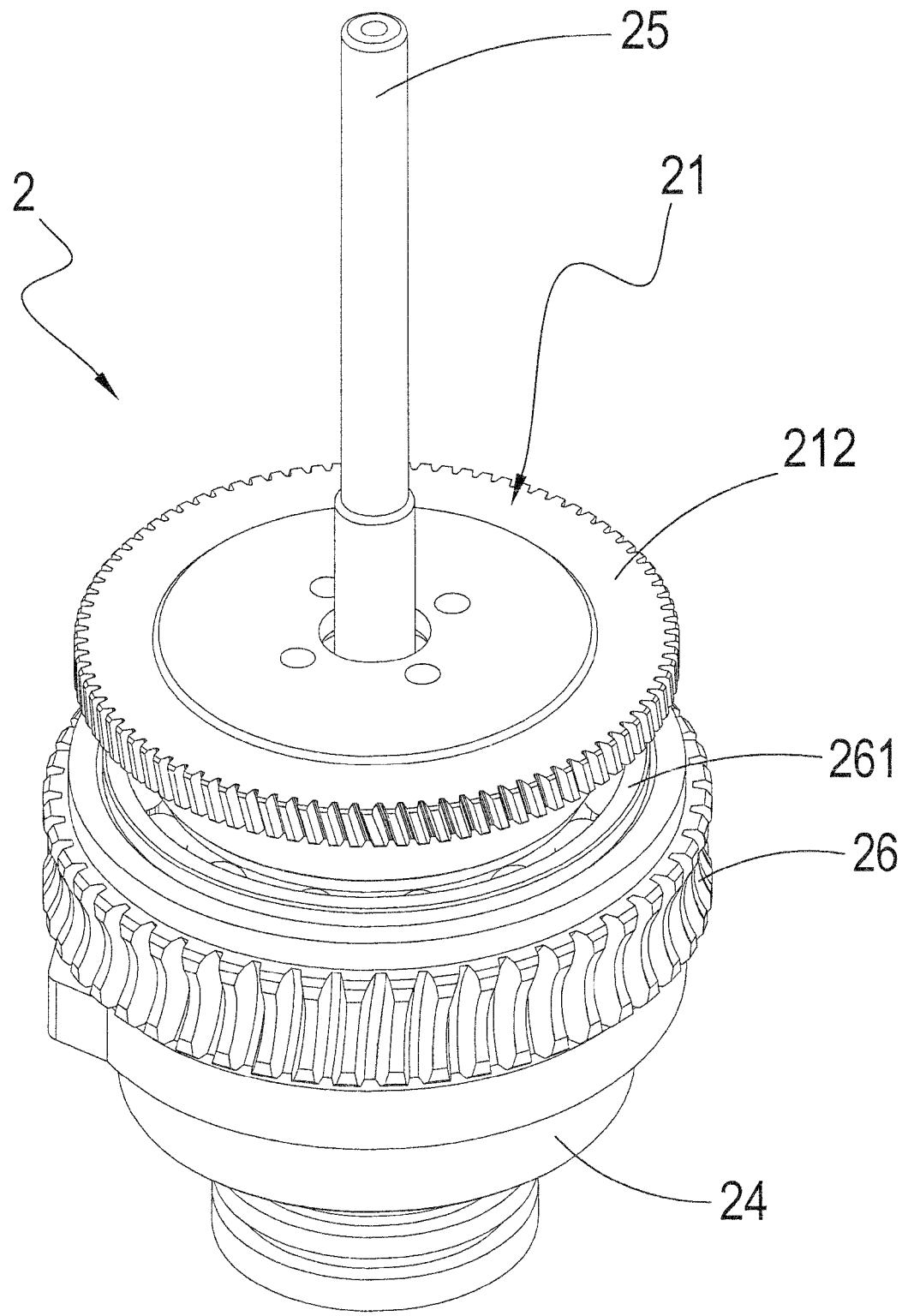
FIG. 1 shows a 3-dimensional view of one embodiment of the present invention.
Figure 1A:
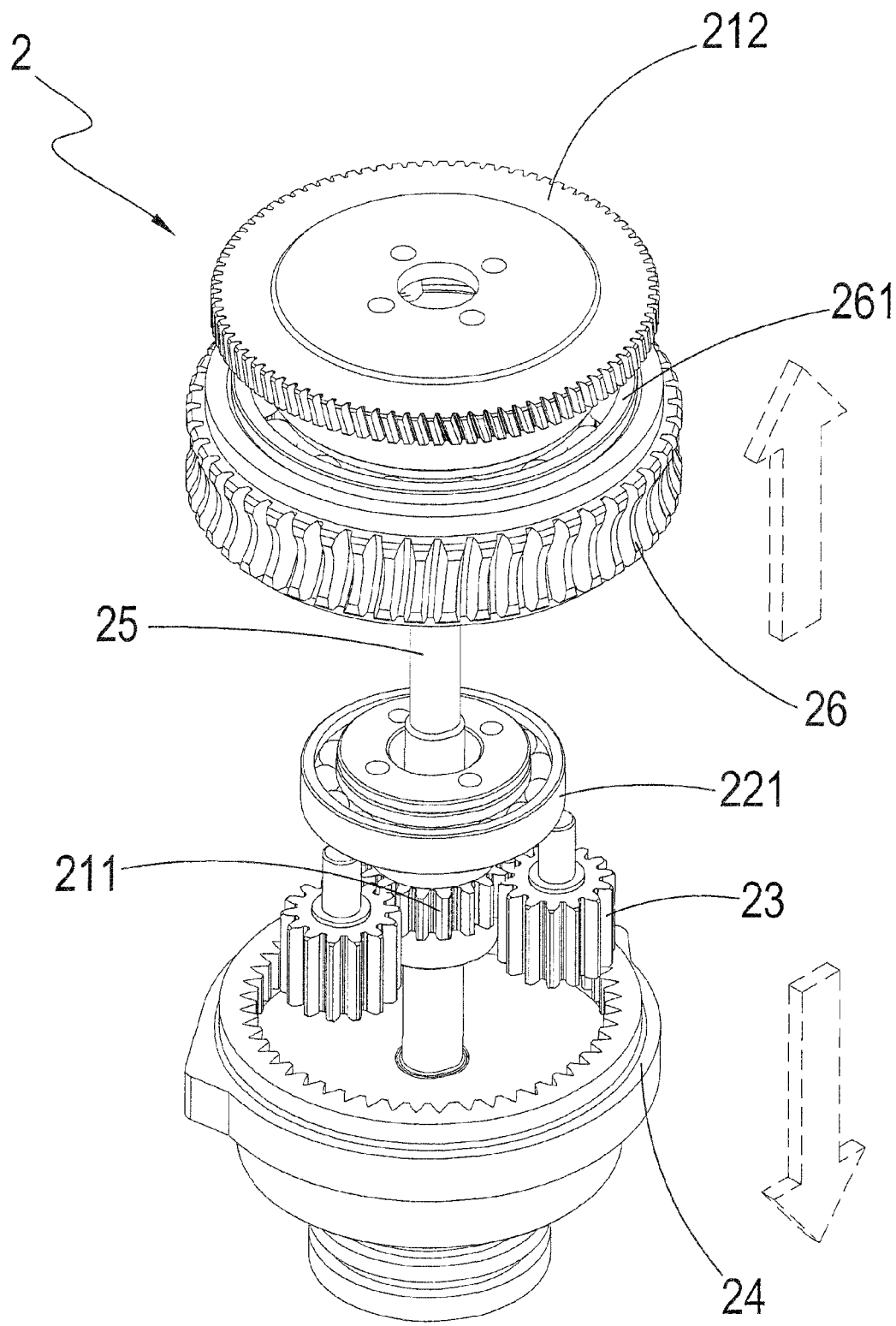
FIG. 1A shows a partially exploded view of the embodiment of the present invention.
Figure 2:
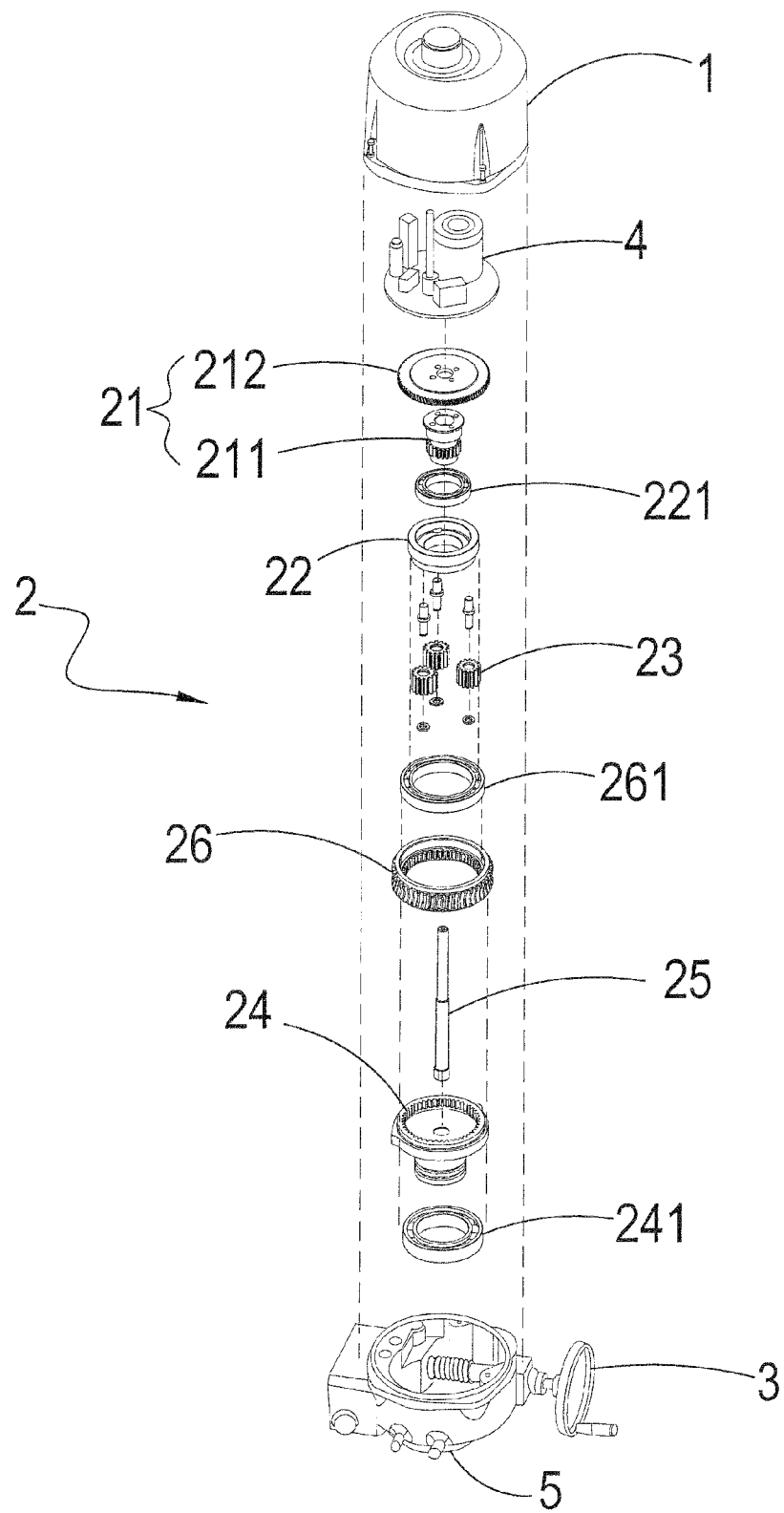
FIG. 2 shows an exploded view of the embodiment of the present invention.
Figure 3:
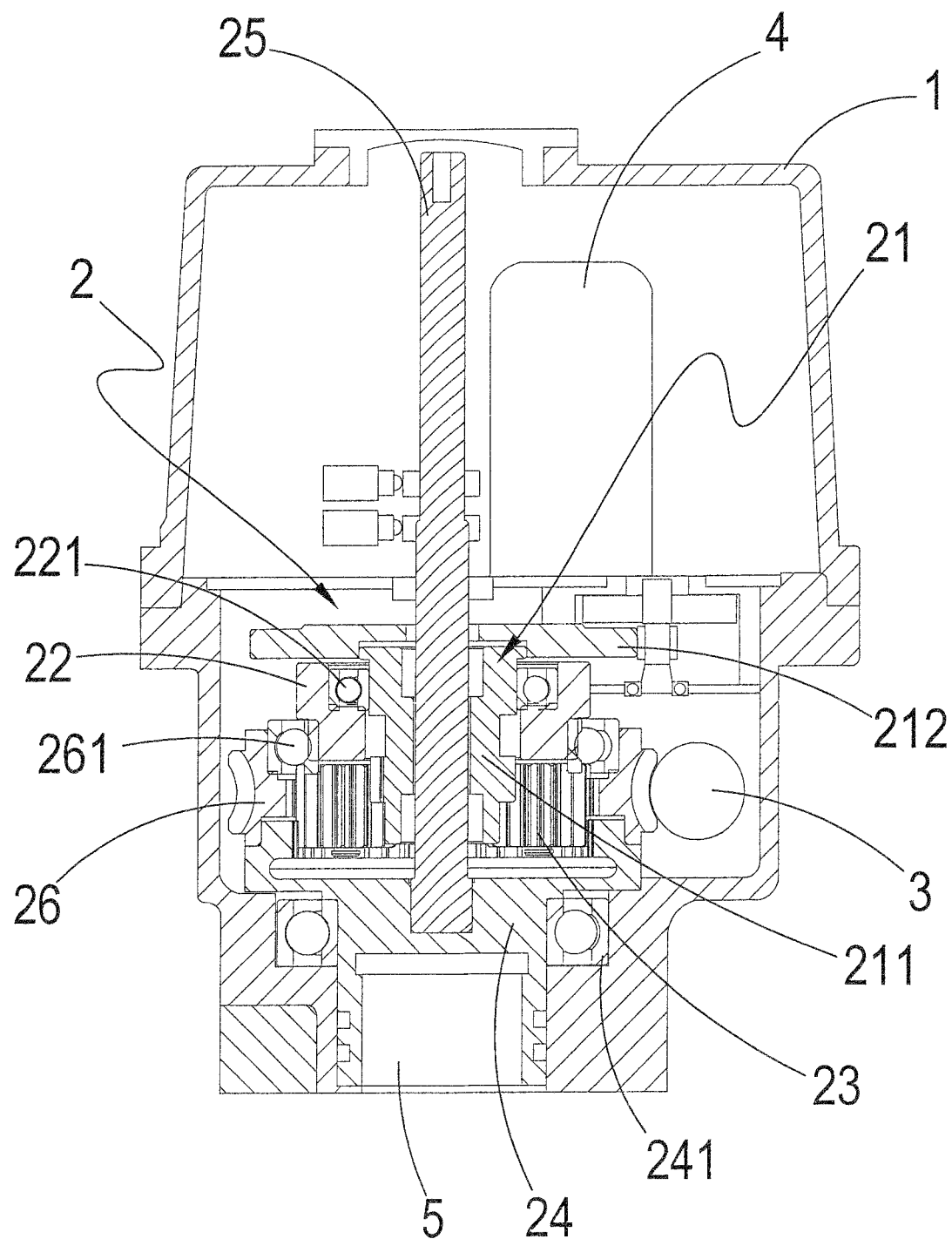
FIG. 3 shows a sectional view of the embodiment of the present invention.
Figure 4:
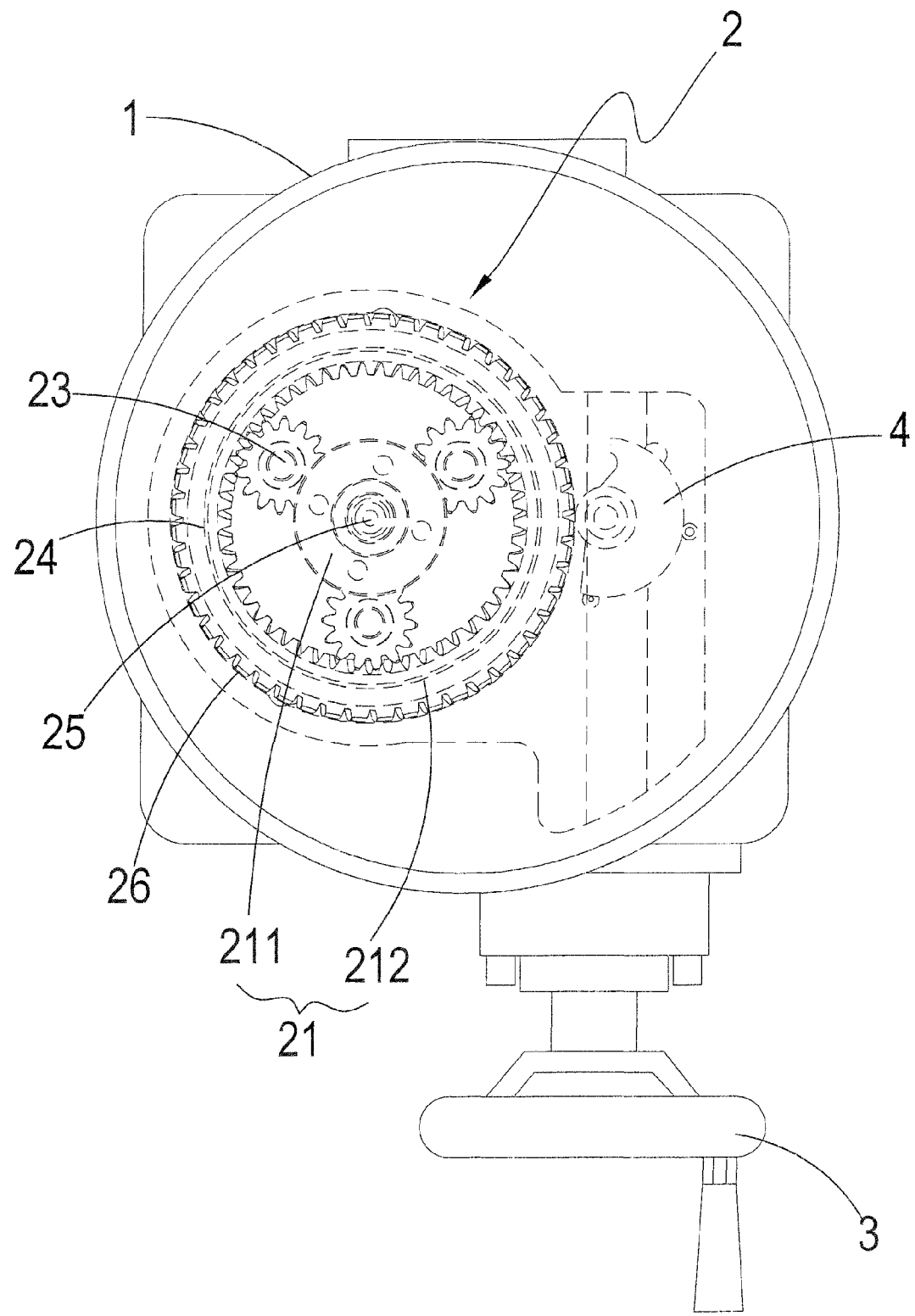
FIG. 4 shows a top plan view of the embodiment of the present invention.

Referring to FIGS. 1, 1A, 2, 3 and 4, an improved device for actuating a valve, according to one embodiment of the present invention, comprises a housing 1 and a gear train 2 accommodated in the housing 1. The gear train 2 generally includes a center gearset 21, a planet-pinion carrier 22, and an output internal gear 24.

The center gearset 21 includes a first external gear 211 and a second external gear 212 being coaxially fixed to the first external gear 211, wherein the second external gear 212 is located above the first external gear 211 and has a dimension greater than the first external gear 211. A central axle 25 is inserted through a center of the first external gear 211 and a center of the second external gear 212, so that the first external gear 211 and the second external gear 212 can rotate about the central axle 25. The center gearset 21 can be driven by an electrical device 4 mounted in the housing 1. In more detail, the electrical device 4 is mounted in mesh with the second external gear 212 of the center gearset 21, so that the first external gear 211 and the second external gear 212 of the center gearset 21 can be driven to rotate about the central axle 25.

The planet-pinion carrier 22 is mounted around the first external gear 211 of the center gearset 21, wherein a first bearing 221, which can be a ball bearing, is mounted between the center gearset 21 and the planet-pinion carrier 22. At least three pinions 23 are rotatably mounted at a bottom or inside of the planet-pinion carrier 22, wherein the pinions 23 are meshed with the first external gear 211 of the center gearset 21.

The output internal gear 24 is mounted in mesh with the pinions 23, wherein a second bearing 241, which can be a ball bearing, is provided between the output internal gear 24 and the housing 1. Therefore, the center gearset 21 can drive the output internal gear 24 into rotation. The central axle 25, which is inserted through the center of the first external gear 211 and the second external gear 212, is inserted into a center of the output internal gear 24, so that the output internal gear 24 can rotate about the central axle 25.

Furthermore, the output internal gear 24 is provided with an output coupling means 5 at a bottom thereof, wherein the output coupling means 5 can be adapted for connection to a shaft of a valve (not shown) for manipulating a flow through the valve. Furthermore, a worm gear 26 is mounted on top of the output internal gear 24 around the pinions 23, wherein the worm gear 26 has internal teeth in mesh with the pinions 23 and external teeth in mesh with a manual-operated worm 3. Also, a third bearing 261, which can be a ball bearing, is provided between the worm gear 26 and the planet-pinion carrier 22.

Figure 5:
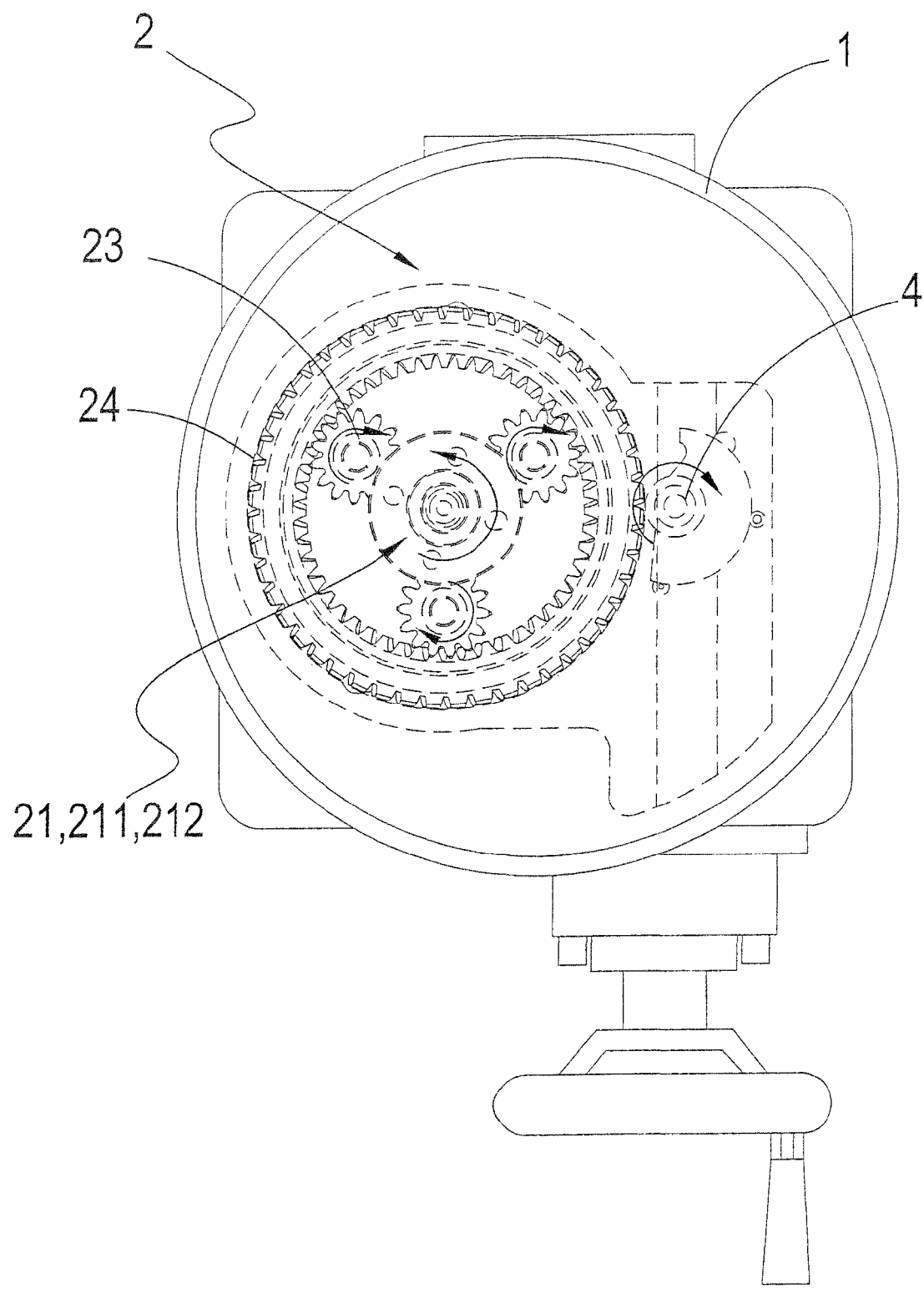
FIG. 5 shows a schematically working view of the embodiment of the present invention, wherein the gear train is driven by the electrical device.
Figure 6:
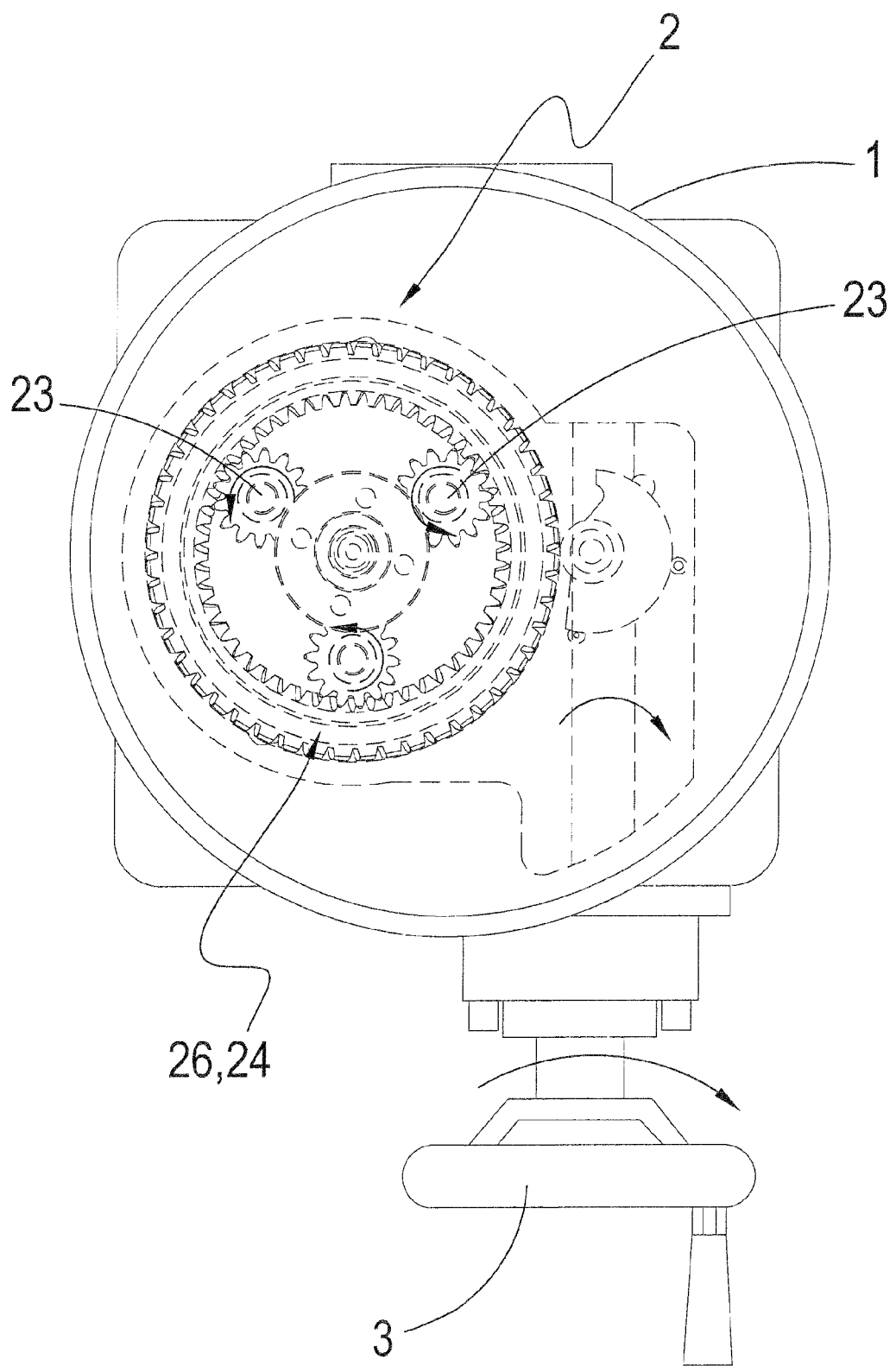
FIG. 6 shows a schematically working view of the embodiment of the present invention, wherein the gear train is driven by the manual-operated worm.

In operation, as shown in FIGS. 3, 4, 5 and 6, the electrical device 4, which is in mesh with the second external gear 212 of the center gearset 21, can drive the second external gear 212 into rotation together with the first external gear 211. The first external gear 211, which is in mesh with the pinions 23, can drive the pinions 23 to rotate. The pinions 23, which is also in mesh with the output internal gear 24, can drive the output internal gear 24 into rotation. The output internal gear 24 can transmit its rotation to a shaft of a valve (not shown) through the output coupling means 5, to manipulate a flow through the valve. In addition, since the worm gear 26 is in mesh with the pinions 23 through the internal teeth thereof and is in mesh with the manual-operated worm 3 through the external teeth thereof, the manual-operated worm 3 can drive the worm gear 26 into rotation, which in turn rotates the pinions 23, which in turn rotates the output internal gear 24, thereby achieving the purpose of manipulating a flow through the valve. In the present invention, three or more pinions are provided for the planet-pinion carrier 22, and this feature may help the device distribute the load and reduce the friction loss, so that the transmission efficiency of the gear train 2 can be increased, the value being approximately between 0.8 and 0.9. The use of the planetary gearset allows the transmission of the gear train 2 to be more stable and can increase the resistance of impact and vibration which come from the actuating device and valve shaft. Also, the use of the planetary gearset can obtain various speed ratios more easily while maintain a secure and compact structure. In addition, the first bearing 221 provided between the center gearset 21 and the planet-pinion carrier 22, the second bearing 241 provided between the output internal gear 24 and the housing 1, and the third bearing 261 provided between the worm gear 26 and the planet-pinion carrier 22, further make the transmission of the gear train 2 be more stable and smooth.

As a summary, the present invention has the following advantages over the prior art:

1. Three or more pinions 23 provided for the planetary gearset can facilitate an even and effective distribution of the load, reduce the friction loss, and improve the transmission efficiency of the gear train.

2. The use of the planetary gearset, including the planet-pinion carrier 22 and the pinions 23, allows the structure to be more secure and compact.

3. The use of the planetary gearset, including the planet-pinion carrier 22 and the pinions 23, allows the transmission of the gear train 2 to be more stable, and can increase the impact and vibration resistance of the actuating device.

4. The first bearing 221 provided between the center gearset 21 and the planet-pinion carrier 22, the second bearing 241 provided between the output internal gear 24 and the housing 1, and the third bearing 261 provided between the worm gear 26 and the planet-pinion carrier 22 further make the transmission of the gear train be more stable and smooth.

5. The manual-operated worm 3 and the worm gear 26 provide additional way of driving the pinions 23 so as to rotate the output internal gear 24.

In light of the foregoing, the present invention can achieve various effects over the prior art and thus is a useful creation.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. An improved device for actuating a valve, comprising a housing and a gear train accommodated in said housing, said gear train including:
    a center gearset including a first external gear and a second external gear located above and coaxially fixed to said first external gear, said second external gear being operatively coupled to and driven by an electrical device to rotate;
    a planet-pinion carrier mounted around said first external gear of said center gearset, wherein a first bearing is provided between said center gearset and said planet-pinion carrier; and at least three pinions are mounted at a bottom or inside of said planet-pinion carrier, said pinions being in mesh with said first external gear of said center gearset; and
    an output internal gear mounted in mesh with said pinions, wherein a second bearing is provided between said output internal gear and said housing;
    wherein a worm gear is mounted on top of said output internal gear around said pinions in such a way that a circumferential rim of said worm gear is received in and supported by a circumferential groove formed in said output internal gear, said worm gear having internal teeth in mesh with said pinions with a third bearing provided between said worm gear and said planet-pinion carrier;
    whereby said center gearset that is driven by said electrical device to rotate drives, via said pinions meshing said first external gear and in mesh with said output internal gear, said output internal gear into rotation, thereby driving output coupling means mounted to a bottom of said output internal gear to rotate so as to provide an output of rotation.

2. An improved device for actuating a valve as claimed in claim 1, wherein more than three pinions are rotatably mounted at a bottom or inside of said planet-pinion carrier.

3. An improved device for actuating a valve as claimed in claim 1, wherein a central axle is inserted through a center of said first external gear, so that said first external gear can rotate about said central axle.

4. An improved device for actuating a valve as claimed in claim 3, wherein said central axle is inserted into a center of said output internal gear, so that said output internal gear can rotate about said central axle.

5. An improved device for actuating a valve as claimed in claim 1, wherein said worm gear has external teeth in mesh with a manual-operated worm.

6. An improved device for actuating a valve as claimed in claim 1, wherein said electrical device is mounted in said housing.

* * * * *